United States Patent [19]

Taylor

[11] Patent Number: 4,585,099
[45] Date of Patent: Apr. 29, 1986

[54] MOLDED PLASTIC CYLINDER FOR ENERGY ABSORBERS, FLUID CYLINDERS, AND THE LIKE

[75] Inventor: Paul H. Taylor, Grand Island, N.Y.

[73] Assignee: Tayco Developments, Inc., North Tonawanda, N.Y.

[21] Appl. No.: 569,777

[22] Filed: Jan. 10, 1984

[51] Int. Cl.⁴ ................................................ F16F 9/32
[52] U.S. Cl. ............................ 188/322.19; 188/322.17
[58] Field of Search .................. 92/166, 169; 188/316, 188/322.16, 322.17, 322.19, 322.22

[56] References Cited

U.S. PATENT DOCUMENTS

| | | | |
|---|---|---|---|
| 2,608,403 | 8/1962 | Luther | 188/322.19 |
| 2,838,300 | 6/1958 | Gray | 188/316 X |
| 3,613,724 | 10/1971 | Carson | 92/169 X |
| 4,265,344 | 5/1981 | Taylor | 188/322.17 |

Primary Examiner—Duane A. Reger
Attorney, Agent, or Firm—Joseph P. Gastel

[57] ABSTRACT

A molded plastic cylinder for an energy absorber, fluid cylinder, or the like, which includes a main body portion having a first outer diameter and a first thickness, and an end portion formed integrally with the main body portion and having a second outer diameter which is less than the first diameter and also having a second thickness which is not substantially greater than the first thickness, an internal shoulder located substantially at the junction of the main body portion and the end portion, and an external thread on said main body portion in a low stressed area of said cylinder for attaching said cylinder to an external structure.

10 Claims, 8 Drawing Figures

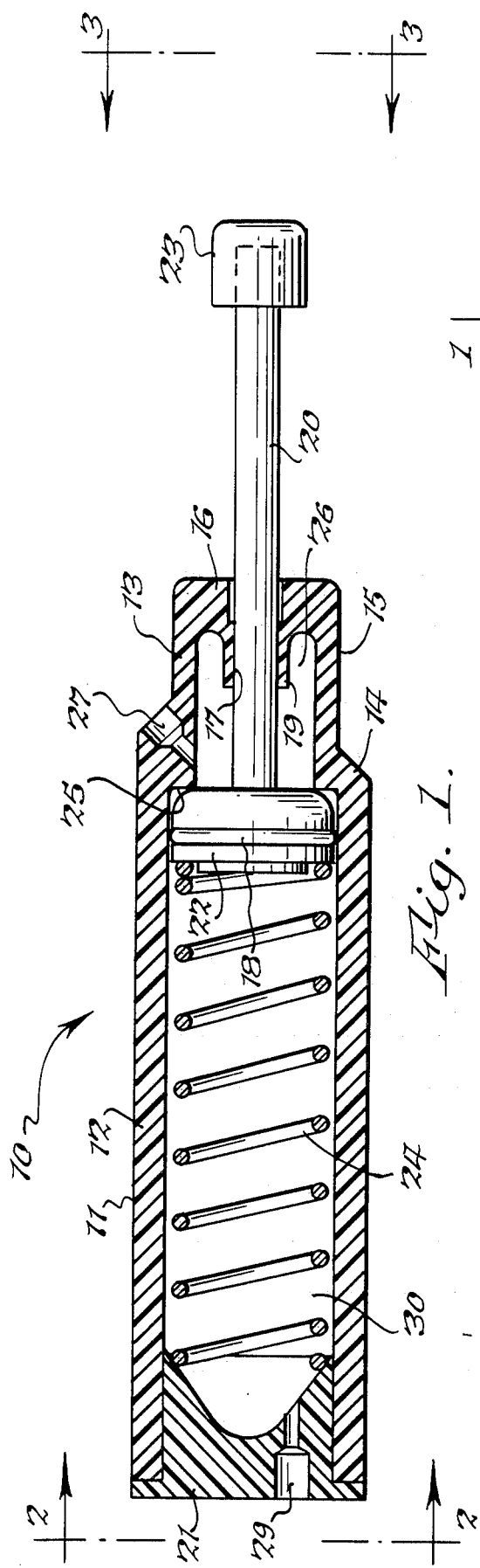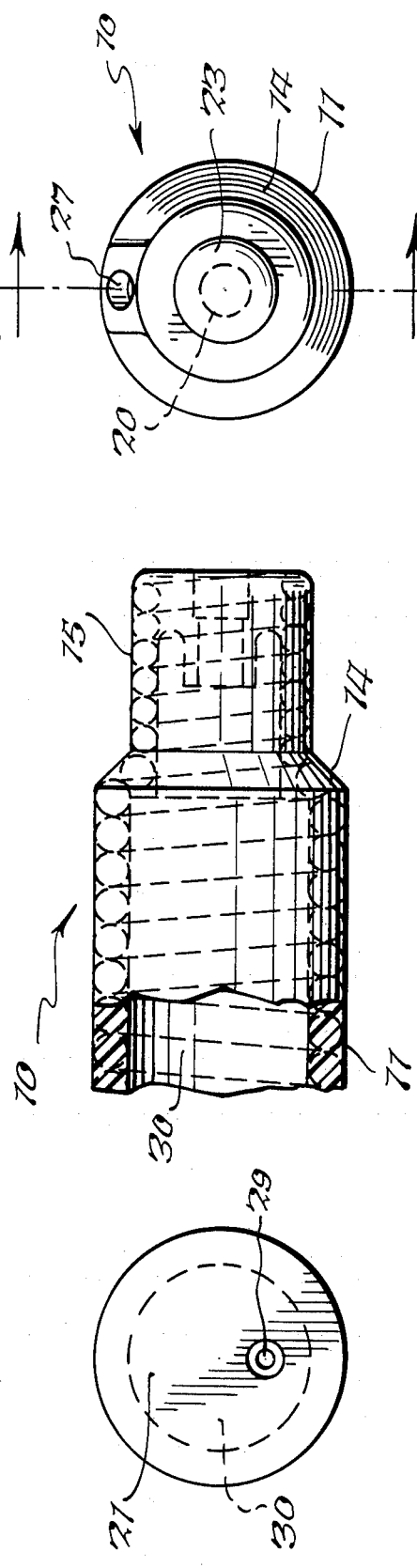

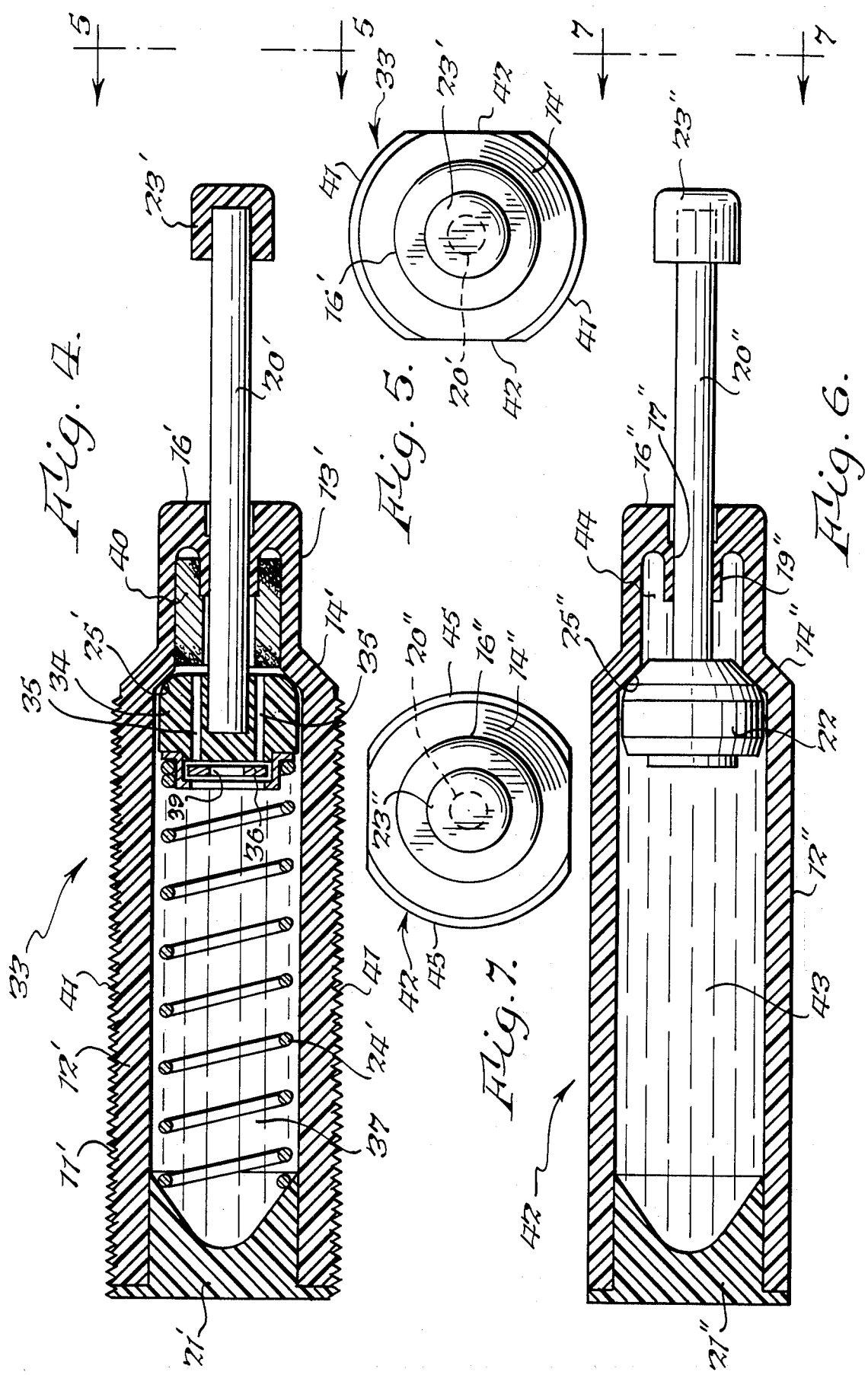

MOLDED PLASTIC CYLINDER FOR ENERGY ABSORBERS, FLUID CYLINDERS, AND THE LIKE

BACKGROUND OF THE INVENTION

The present invention relates to a molded plastic cylinder construction which may be used for energy absorbers, fluid cylinders, and the like, such as liquid springs, liquid shock absorbers, air cylinders and hydraulic cylinders.

By way of background, plastic cylinders can be used for liquid springs, liquid shock absorbers, air cylinders and hydraulic cylinders. However, molding of such cylinders is difficult when there are sections of substantially different thickness, as there is a tendency for voids to form in the thicker portions. It is also difficult to mount plastic cylinders on external structure because the relatively low structural strength of plastic, as compared with metal, precludes the use of conventional attachment arrangements heretofore used with metal cylinders. It is with overcoming the foregoing deficiencies of prior plastic cylinders that the present invention is concerned.

SUMMARY OF THE INVENTION

It is accordingly one object of the present invention to provide a molded plastic cylinder construction which can be used for liquid springs, shock absorbers, air cylinders and hydraulic cylinders, and which can be produced at a low cost.

Another object of the present invention is to provide a molded plastic cylinder which is fabricated by laying the outer wall in the form of a helical plastic ribbon to thereby provide maximum hoop stress.

A further object of the present invention is to provide an improved molded plastic cylinder in which the various parts are proportioned so that the tendency for the formation of voids in the thicker portions is obviated.

A still further object of the present invention is to provide an improved molded plastic cylinder in which the proportioning of the wall automatically results in the fabrication of an internal shoulder.

Another object of the present invention is to employ a helical thread on the external surface of a plastic cylinder for transmitting structural loads to said plastic cylinder having a capacity for comparatively low stresses, said helical thread having the quality of not substantially detracting from the hoop stress resistance of the plastic cylinder. Other objects and attendant advantages will be more fully perceived hereafter.

The present invention relates to a molded plastic body for an energy absorber, fluid cylinder, or the like, comprising a main body portion having a first outer diameter and a first thickness, and an end portion formed integrally with said main body portion and having a second outer diameter which is less than said first diameter and also having a second thickness which is not substantially greater than said first thickness such as to avoid formation of voids in said second thickness, and an internal shoulder located substantially at the junction of said main body portion and said end portion. The various aspects of the present invention will be more fully understood when the following portions of the specification are read in conjunction with the accompanying drawings wherein:

BRIEF DESCRIPTION OF THE DRAWINGS

FIG. 1 is a cross sectional view taken substantially along line 1—1 of FIG. 3 showing the configuration of an energy actuator cylinder, the cylinder being part of a fluid actuated spring biased device utilized for clamping action;

FIG. 1A is a fragmentary view partially in cross section and partially in side elevation showing the manner in which a cylinder such as shown in FIG. 1 can be fabricated;

FIG. 2 is a view taken substantially in the direction of arrows 2—2 of FIG. 1;

FIG. 3 is a view taken substantially in the direction of arrows 3—3 of FIG. 1;

FIG. 4 is a cross sectional view of an energy absorber device of the type of FIGS. 1 and 1A which is a liquid shock absorber and which has an external thread thereon;

FIG. 5 is an end view taken substantially in the direction of arrows 5—5 of FIG. 4;

FIG. 6 is a cross sectional view of an energy absorber device of the type shown in FIGS. 1 and 1A which is a liquid spring; and FIG. 7 is an end view taken substantially in the direction of arrows 7—7 of FIG. 6.

DESCRIPTION OF THE PREFERRED EMBODIMENTS

The fluid cylinder 10 of the present invention includes a molded plastic cylinder 11 having a main body portion 12 joined to an end body portion 13 of lesser outer diameter by a neck portion 14. The portion 15 of end portion 13 has a thickness which is substantially equal to the thickness of main body portion 12, and preferably not substantially greater than the thickness of the main body portion 12, but it may be of lesser thickness. The criterion for the relative thicknesses of portions 15 and 12 is that portion 15 should not be so thick as to cause the formation of voids in the thicker portion. End portion 13 has an integral end cap 16 in which a bore 17 is formed, the peripheral portion 19 of end cap 16 surrounding bore 17 forming an integral seal for piston rod 20. An end wall 21 is suitably affixed within main body portion 12 as by sonic welding or cementing.

During the process of assembly of fluid cylinder 10, piston rod 20 is inserted through bore 17 from left to right in FIG. 1 before end wall 21 is installed. At that time piston rod 20 already mounts a piston head 22 having an O-ring seal 18 mounted in a groove therein. Thereafter, cap 23 is pressed onto the end of the piston rod 20. Spring 24 is then inserted into main body portion 12, and thereafter end wall 21 is secured to main body portion 12, as by cementing or sonic welding. As can be seen from FIG. 1, piston head 22 is biased against annular shoulder 25 by spring 24. This shoulder is formed during the molding process. Fluid cylinder 10 may be of the type wherein spring 24 biases end cap 23 against a part to be held. When pressurized fluid is forced into chamber 26 through port 27 in neck portion 14, piston 20 moves to the left to release the part held by end cap 23. A vent 29 is provided in end wall 21 to vent chamber 30. When the fluid pressure is released from chamber 26, spring 24 will expand to return piston head 22 to the position shown in FIG. 1.

The fluid cylinder 10 of FIG. 1, with modification, can become a double-acting fluid actuator. All that is necessary is to eliminate spring 24 and use port 29 to admit pressurized fluid. When cylinder 10 is modified to be double-acting, when port 27 or 29 is used to admit pressurized fluid, the other port will be utilized as a vent. Furthermore, when piston 20 is moved to the right at high speed, the impact on shoulder 25 will be cushioned by the resilience of the plastic material of the shoulder and the cylinder 11, thereby eliminating the necessity for use of hydraulic shock cushioning devices which might otherwise be necessary on other types of cylinders.

If desired, spring 24 of cylinder 10 may be positioned between piston head 22 and shoulder 25 so that the piston head is biased against wall 21. When constructed in this manner, the introduction of pressurized fluid through port 29 will cause piston rod 20 to move to the right to effect a clamping action, and when the pressure is relieved at port 29, spring 24 will return piston head 22 to its position against wall 21 and thus move the piston rod accordingly to terminate the clamping action.

As stated briefly above, in the past fluid cylinders which were molded of plastic had a uniform outer diameter throughout their length, as shown in U.S. Pat. No. 4,265,344. However, in such cylinders, the end portion analogous to portion 13 of the present cylinder was thicker so that it could provide an annular shoulder, such as 25. This sometimes resulted in gas pockets being formed at the junction of the thinner and thicker portions in the device of U.S. Pat. No. 4,265,344. However, by maintaining the wall thickness of end portion 13 substantially equal to and substantially no greater than the thickness of wall portion 12, the foregoing problem was alleviated. The wall thickness of end portion 13 may be less than the thickness of wall portion 12, if desired, provided that it will have sufficient hoop strength. The only limitation on the thickness of end portion 15 is that it should be sufficiently thick to have adequate hoop strength and it should not be substantially thicker than the thickness of wall portion 12 so as to avoid formation of gas bubbles in the neck portion 14.

In FIG. 1A, the preferred method of fabricating cylinder 11 is schematically shown. This form of fabrication provides the maximum hoop stress resistance by causing the gates of the mold to be positioned so the flow of plastic is in the form of a continuous helical ribbon, as shown, the ribbon merging to form the solid walls, such as shown in FIG. 1. As noted above, by forming the cylinder 11 in the foregoing manner, its hoop stress resistance is increased. However, the cylinder of FIG. 1 can also be formed by conventional injection molding for low stress applications.

In FIGS. 4 and 5 an energy absorber unit 33 is shown in which the cylinder 12' was formed in the manner described above relative to FIGS. 1 and 1A, and accordingly numerals which are primed will represent structure analogous to the unprimed numerals of FIG. 1. The energy absorber device 33 of FIG. 4 is a spring-shock having the same cylinder construction as the fluid cylinder of FIGS. 1 and 1A. Piston head 34 has a plurality of bleed bores 35 therein, and a check valve 36 covers bores 35 to prevent the flow of compressible fluid in chamber 37 from flowing through bores 35 when piston head 34 moves to the left against the bias of spring 24'. When piston head 34 moves to the left, the flow of compressible fluid will be around piston head 34. An annular non-interconnected foam member 40, which is located in reduced end portion 13' as shown, reduces in volume as piston rod 20' enters cylinder 11'. When piston head 34 moves to the right as spring 24' expands after the force which moved piston head 34 to the left is released, valve 36 unseats to permit fluid to flow from the right of piston head 34 through bores 35 and through opening 39 in valve 36 into chamber 37. The external surface of cylinder portion 12' is threaded at diametrically opposite portions 41 so that it may be secured to a suitable tapped base, without requiring additional brackets. The threads 41 are formed on the outside or low stressed portion of the cylinder which is subjected to critical hoop bursting stresses, and thus the threads do not provide the high stress points which can produce hoop or notch failure. Thus, the threads 41 provide large diameter, lightly loaded threads in the low stress area of a pressure vessel using a comparatively low strength plastic. The sides of cylinder portion 12' may have flats 42 thereon throughout their length for gripping by a wrench.

In FIGS. 6 and 7 another embodiment of the present invention is shown wherein the cylinder of the energy absorber unit 42 has the same basic structure discussed above relative to FIGS. 1 and 1A but is in the nature of a pure liquid spring type of shock absorber. The double primed numerals applied to FIGS. 6 and 7 represent structure which is largely identical to or analogous to structure of FIG. 1 bearing unprimed numerals, and therefore an additional discussion is deemed unnecessary. This embodiment differs from that of FIG. 1 in that shoulder 25" and fluid amplified head 22 are made in accordance with the teachings of U.S. Pat. No. 3,722,640. In this instance, a different core pin is used in the molding die to provide the tapered shoulder stop 25" and matching complementary piston head configuration 22. The tapered shoulder also provides more even plastic flow for avoidance of even tiny gas voids in ultra high pressure cylinders. In this embodiment chambers 43 and 44 are filled with compressible liquid so that as piston rod 20" enters these chambers, the liquid will be compressed and when the force on cap 23", which caused piston rod 20" to enter, is released, the expansion of the compressible liquid within chambers 43 and 44 will cause the piston rod 20" to move to the position shown in the drawing wherein piston head 22 abuts annular shoulder 25". Preferably main body portion 12" includes threads 45 on opposite sides thereof, as described in detail above relative to FIG. 4. If desired, shoulder 25 of FIG. 1 may also be of a shape which is complementary to the surface of a piston head.

A preferred plastic for use in all the foregoing embodiments is nylon. However, other structural and sealing plastics, such as DELRIN may be used which provide high strength and low friction sealing characteristics.

In addition, suitable high strength composite or metal liners can be used, such as disclosed in my copending patent application Ser. No. 370,738, filed Apr. 22, 1982.

While preferred embodiments of the present invention have been disclosed, it will be appreciated that the present invention is not limited thereto but may be otherwise embodied within the scope of the following claims.

What is claimed is:

1. A molded plastic body for an energy absorber, fluid cylinder, or the like, comprising a main body portion having a first outer diameter and a first thickness, an end body portion molded integrally with said main body portion and forming a continuation of said main body portion and extending axially thereof, said end body portion having a second outer diameter which is less than said first outer diameter and also having a second thickness which is not substantially greater than said first thickness such as to avoid formation of voids in said second thickness, and an internal shoulder located substantially at the junction of said main body portion and said end body portion.

2. A molded plastic body for an energy absorber, fluid cylinder, or the like as set forth in claim 1 including an end wall formed integrally with said end body portion, and a bore in said end wall for receiving a piston member.

3. A molded plastic body for an energy absorber, fluid cylinder, or the like as set forth in claim 2 wherein said end wall includes an outer periphery about said bore which comprises a seal for said piston member.

4. A molded plastic body for an energy absorber, fluid cylinder, or the like as set forth in claim 1 wherein said energy absorber body comprises a helically wound continuous plastic ribbon which has been fused to thereby provide hoop strength.

5. A molded plastic body for an energy absorber, fluid cylinder, or the like as set forth in claim 1 including threads on the outside of said main body portion, said first thickness being sufficiently large so that said threads lie outside of the hoop stress area of said main body portion.

6. A molded plastic body for an energy absorber, fluid cylinder, or the like as set forth in claim 1 wherein said internal shoulder is tapered to provide relatively even flow during fabrication and to provide mating engagement with a complementary surface of a piston head.

7. A molded plastic body for an energy absorber, fluid cylinder, or the like as set forth in claim 6 wherein said main body portion and said end body portion are of substantially the same thickness, and a neck portion formed integrally with and joining said main body portion and said end body portion, said neck portion being of substantially the same thickness as said main body portion and said end body portion, and said internal shoulder being located on said neck portion proximate the junction of said main body portion and said neck portion.

8. A molded plastic body for an energy absorber, fluid cylinder, or the like as set forth in claim 1 including a neck portion formed integrally with and joining said main body portion and said end body portion, said internal shoulder being located on said neck portion proximate the junction between said neck portion and said main portion.

9. A molded plastic body for an energy absorber, fluid cylinder, or the like as set forth in claim 8 including an end wall formed integrally with said end body portion, a bore in said end wall for receiving a piston member, and an outer periphery about said bore which comprises a seal for said piston member.

10. A molded plastic body for an energy absorber, fluid cylinder, or the like as set forth in claim 9 wherein said energy absorber body comprises a helically wound continuous plastic ribbon which has been fused to provide hoop strength.

* * * * *